United States Patent
Laruelle et al.

(10) Patent No.: US 9,892,425 B2
(45) Date of Patent: Feb. 13, 2018

(54) SYSTEM FOR MANAGING DYNAMIC PLACEMENT OF ADVERTISEMENTS IN ELECTRONIC INFORMATION PAGES

(75) Inventors: Frederic Laruelle, Daly City, CA (US); Ralf Pfeiffer, Daly City, CA (US); Rick Phung, Daly City, CA (US); David Van Everen, Daly City, CA (US)

(73) Assignees: Genesys Telecommunications Laboratories, Inc., Daly City, CA (US); Alcatel Lucent, Boulogne-Billancourt (FR)

( * ) Notice: Subject to any disclaimer, the term of this patent is extended or adjusted under 35 U.S.C. 154(b) by 2404 days.

(21) Appl. No.: 11/462,292

(22) Filed: Aug. 3, 2006

(65) Prior Publication Data
US 2007/0226057 A1  Sep. 27, 2007

Related U.S. Application Data

(60) Provisional application No. 60/786,489, filed on Mar. 27, 2006.

(51) Int. Cl.
 G06Q 30/00 (2012.01)
 G06Q 30/02 (2012.01)

(52) U.S. Cl.
 CPC ......... *G06Q 30/0256* (2013.01); *G06Q 30/02* (2013.01); *G06Q 30/0277* (2013.01)

(58) Field of Classification Search
 USPC .......................................................... 705/14
 See application file for complete search history.

(56) References Cited

U.S. PATENT DOCUMENTS

| 7,158,628 B2* | 1/2007 | McConnell et al. ...... 379/265.02 |
| 2005/0091111 A1* | 4/2005 | Green et al. .................... 705/14 |
| 2006/0026063 A1 | 2/2006 | Collins |
| 2006/0026067 A1* | 2/2006 | Nicholas et al. ............... 705/14 |
| 2006/0041536 A1 | 2/2006 | Scholl et al. |
| 2006/0048061 A1* | 3/2006 | Forlenza et al. ............. 715/751 |
| 2006/0165066 A1* | 7/2006 | Campbell et al. ........... 370/352 |

* cited by examiner

*Primary Examiner* — Alvin L Brown
(74) *Attorney, Agent, or Firm* — Stephen J. Wyse

(57) ABSTRACT

A system for serving electronic advertisements over a data packet network has a node connected to the data packet network, data storage accessible to the node for holding advertisements for service and associated data, and a software instance running on the node for selecting and causing placement of advertisements including selected associated data. The system is characterized in that the advertisements are selected and served base on some real time information accessible to the software instance and wherein the associated data may be individually or collectively embedded into or deployed with the advertisements based at least in part on evaluation of the information accessed.

14 Claims, 3 Drawing Sheets

SYSTEM FOR MANAGING DYNAMIC PLACEMENT OF ADVERTISEMENTS IN ELECTRONIC INFORMATION PAGES

CROSS-REFERENCE TO RELATED APPLICATIONS

The present invention claims priority to a U.S. provisional patent application Ser. No. 60/786,489 filed on Mar. 27, 2006 entitled, "Opportunistic Online Ad Placement". The disclosure is included herein at least by reference.

BACKGROUND OF THE INVENTION

1. Field of the Invention

The present invention is in the field of advertising, more particularly in online advertising in conjunction with serving electronic information pages over a data packet network. The present invention pertains specifically to methods and apparatus for serving online advertisements according to dynamically changing conditions.

2. Discussion of the State of the Art

In the field of electronic placement of advertisements, much focus has been directed on relevancy in ad placement. For example, ad placement services work for clients by placing electronic advertisements into electronic information pages served as a result of some browser navigation activity. The advertisements served may be graphic or text ads and often contain embedded objects that may be interacted with to initiate contact between the customer and the advertiser. Served ads can be relevant to a number of known factors about a person accessing the information page that supports the ad placement. One of these factors is browser behavior collected from the customer as was described above. Another factor might be results of navigation histories at a site cooperating with the ad placement services.

More recently, some companies that facilitate data search services serve advertisements on behalf of advertisers into an electronic information search result page served as a result of a key word or phrase search performed by the customer interacting with a search engine. In this method, advertisers pay a specific amount each time an advertisement is served and the customer clicks the ad. A problem with this type of advertising is that is requires a lot of effort on the part of the advertiser to manage the ad accounts and to optimize the possibilities of ad placement through intelligent keyword and phrase management. Also, the contact information is the same each time the advertisement is placed no matter where or when the ad is served. Likewise, ads placed electronically must be prearranged and booked ahead of time. Therefore information attached to the advertisement like contact information is static such as a Web link or email address.

What is clearly needed is a system and method for placing electronic advertisements based on available current contact information at the time of ad placement and/or state of activity level of the advertiser at the time of ad placement. Such a system and service would enable opportunistic placement of ads at such times when those responses may be serviced best.

SUMMARY OF THE INVENTION

According to an embodiment of the present invention, a system for serving electronic advertisements over a data packet network is provided. The system includes a node connected to the data packet network, data storage accessible to the node for holding advertisements for service and associated data, and a software instance running on the node for selecting and causing placement of advertisements including selected associated data. In one embodiment, the advertisements are selected and served base on some real time information accessible to the software instance and wherein the associated data may be individually or collectively embedded into or deployed with the advertisements based at least in part on evaluation of the information accessed.

In one embodiment, the data packet network is the Internet network and the node is an advertisement server. In a variation of this embodiment, the electronic advertisements are one of banner advertisements or text advertisements served to a search result page served as a result of a data search, the ads relevant to the keywords or phrase used in the search.

In one embodiment, the real time information includes live contact availability information defined as available or not over a specific communications channel. In another embodiment, the real time information includes current wait time for a live agent to respond to a communication session over a communication channel, the session initiated through interaction with the served advertisements. Also in one embodiment, the associated data includes one or more live contact hyperlinks embeddable into the advertisement placeholder along with the advertisement.

In one embodiment, the one or more hyperlinks are personal to the agent working the communications end point addressed by the link or links. In one embodiment, the real time information is accessed locally from the data storage. In another embodiment, the real time information is accessed from a remote node over the data packet network. In a variation of this embodiment, the remote node is a router running an availability reporting routine.

According to another aspect of the invention, in a system for serving electronic advertisements over a data packet network, a method is provided for determining whether to serve an electronic advertisement selected for service. The method includes acts (a) accessing at least one preset value associated with the advertisement, (b) accessing current statistics relevant to the at least one preset value, (c) comparing, according to at least one condition, the current statistics to the at least one preset value, and (d) serving or not serving the advertisement based on the results of the comparison of act (c).

In one aspect, in act (a), there is one preset value defined as a period of time and in act (b) the current statistics are the current time, the condition whether or not the current times falls within the time period. In one aspect, in act (a), there is one preset value defined as a state of presence and in act (b) the current statistics are the current availability state of a live response, the condition being yes or no. In another aspect, in act (a), there is more than one present value collectively defined as availability states over specific media channels, and in act (b) the current statistics are the availability states for those channels, the conditions yes or no for each channel.

In another aspect, in act (a), there is more than one preset value collectively defined as a periods of wait time for response over specific media channels, and in act (b), the current statistics are the wait times for those channels, the condition whether or not the current wait times are smaller than the periods of wait time for each of the channels. In one aspect, in act (d) the ad is not served but another ad is served instead by default.

According to another aspect, the method further includes an act performed between act (c) and act (d) for embedding current contact hyperlinks into the ad relevant to the statistics accessed in act (b). In a variation of this aspect, the hyperlinks are personalized with the names of the contacts addressed.

According to yet another embodiment of the present invention, a machine-readable medium is provided having stored thereon a set of instructions that cause a machine to perform a method including (a) accessing at least one preset value associated with the advertisement, (b) accessing current statistics relevant to the at least one preset value, (c) comparing, according to at least one condition, the current statistics to the at least one preset value, and (d) serving or not serving the advertisement based on the results of the comparison of act (c).

In one embodiment, the set of instructions further includes one between (c) and (d) for embedding current contact hyperlinks into the ad relevant to the statistics accessed in act (b).

BRIEF DESCRIPTION OF THE DRAWING FIGURES

DETAILED DESCRIPTION

Figure 1:
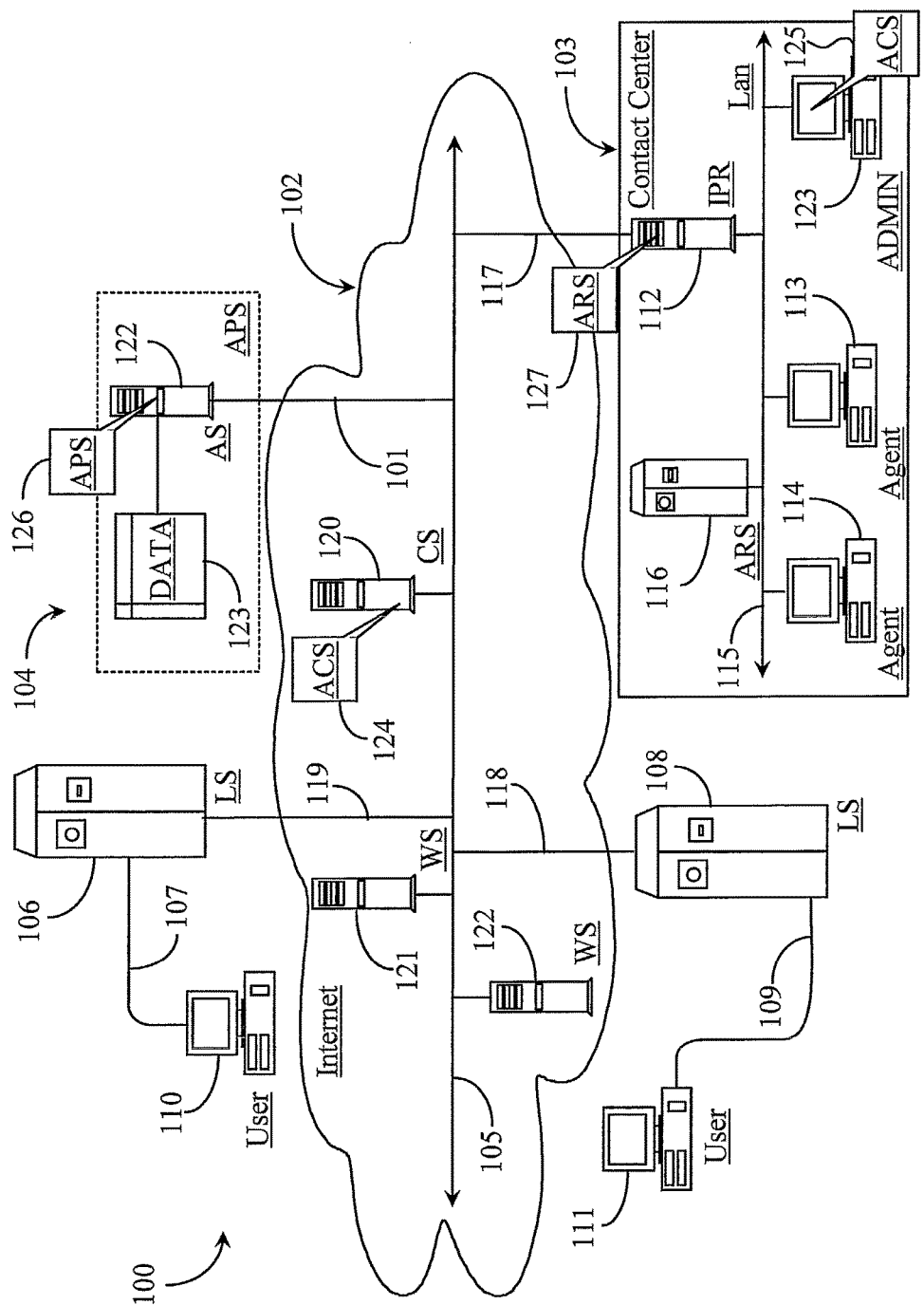
FIG. 1 is an architectural overview of a data communication environment practicing opportunistic ad placement according to an embodiment of the present invention.

FIG. 1 is an architectural overview 100 of a data communication environment practicing opportunistic ad placement according to an embodiment of the present invention. Overview 100 includes an Internet network 102 serving as a carrier network for electronic ad placement. Internet 102 may be another type of data packet network without departing from the spirit and scope of the present invention. Examples may include an Intranet, an Ethernet, a local area network (LAN) or others. The inventor chooses the Internet because of its high public access characteristic and because of its established ad placement standards and protocols. Internet 102 is exemplified by an Internet backbone 105 that meant to represent all of the access points, network lines, and equipment that make up the Internet network as a whole. Therefore, there are no geographic limitations to practice of the present invention.

A contact center 103 is illustrated as part of the network environment of overview 100 and has access to Internet backbone 105 by way of an Internet access line 117 from an Internet Protocol Router (IPR) 112 deployed within contact center 103. IPR 112 is adapted to route incoming communications events internally within center 103. Access line 117 may be any type of data line capable of high-speed Internet access and communication. Contact center 103 might be a call-in center offering customer service and sales of new products, which might be advertised in this exemplary scenario. Center 103 includes a LAN 115 supporting IPR 112.

LAN 115 deployed within center 103 supports an agent workstation 113, and an agent workstation 114. Workstations 113 and 114 are manned by contact center agents and may be assumed to be full communications capable multimedia workstations. LAN 115 supports an automated response system (ARS) or server 116. System 116 may be any type of auto-response server that may communicate with a customer of center 103 without human intervention. Auto email, Instant Message (IM), Voice over Internet Protocol (VoIP), and other types of media may be supported by system 116. Agents operating at stations 113 and 114 are charged with servicing customers and potential new customers.

LAN 115 has an administrative workstation 123 illustrated therein and adapted to enable an administrative or other authorized individual to create advertisements for products and services and to deploy those advertisements to third-party advertisement placement services. In this example, center 103 does not exhibit any telephony equipment or lines so as not to distract from the aspect of online electronic advertising. However, it may be assumed in this example that center 103 has telephones provided to agents for the purpose of telephone communication, and it is understood that the result of clicking on an electronic advertisement may be an initiated telephony call over data or over conventional plain old telephony service (POTS) lines.

Overview 100 includes an ad service business (ASB) entity or domain 104. ASB 104 is adapted to insert advertisements electronically into Web pages on behalf of clients subscribing to ad placement services. ASB 104 may simply be an ad placement company or it may also provide base services like data search or some other Internet based service that may create an attractive avenue for ad placement. Examples include Internet services like AOL™, Yahoo™, MySpace™, or other similar service providers. There are many variant possibilities including popular companies selling advertising space on their Web sites and the like.

Entity 104 includes an ad server (AS) 122. AS 122 is adapted to insert advertisements into Web pages in dynamic fashion based on some browser-based trigger event. AS 122 has connection to backbone 105 within Internet 102 via a high-speed Internet access line 101. In prior art, dynamic ad insertion may use static advertisements that are pre-created and loaded into the code of a Website such that when a user calls the advertisement by executing the trigger, the addressed ad appears in the ad placeholder embedded in the page display code. The actual advertisements may be loaded locally on the server that hosts the Web page that will display those ads. Dynamic service of those ads simply refers to the fact that the exact ad appearing in the placeholder may vary according to the condition, which triggered the ad.

According to an embodiment of the present invention, dynamic advertisements may be served based on current dynamic principles the ads themselves having updateable embeds such as contact links that link to current agents and or systems that are determined available to service the ad at the time of placement of the ad. According to one embodiment of the present invention such advertisements may further be served or not dynamically based on real-time considerations such as the current business load on the advertiser at the time the advertisement would otherwise be served. For example, an advertiser may launch an ad campaign that kicks in only when it is ascertained that the advertiser has the capacity to readily service customers interacting with those advertisements. More about these unique capabilities will be discussed below.

Internet 102 includes a Web server 121, and a Web server 122. Web servers 121 and 122 are electronic information servers adapted to host serve Web pages that may be accessed by those navigating the Internet using a browser program. Internet 102 also includes a contact server 120 hosting an instance of advertisement configuration software (ACS) 124 that is assumed in this example to be hosted by ASB 104 and made available to potential advertisers to use to configure their advertisements for eventual placement. Alternatively, ad configuration may be performed locally such as on ADMIN station 123 within contact center 103 using a local instance of the software.

In this example, an instance of ad configuration software (ACS) 125 is provided as a client application loaded on workstation 123. An operator using ACS 125 may create advertisements and upload those advertisements to AS 122 for eventual placement.

AS 122 includes an instance of ad placement software (APS) 126 installed and executable thereon. APS 126 is adapted to server dynamic ads according to real time conditions and triggers.

Environment 100 includes illustrated customers or Internet users illustrated herein as a user 110 and a user 111. Users 110 and 111 may operate any type of Internet capable appliance to interact with dynamic advertisements according to an embodiment of the present invention. The only requirement is that the appliance is capable of browsing Web pages containing the advertisements and that the appliance has sufficient input capability enabling the user to interact with the advertisements.

In this example, user 110 has connection to Internet 102 via a local telephony switch (LS) 106 via a telephony line 107 and an Internet Service Provider (ISP), which is not illustrated for convenience but may be assumed present. User 110 may have connection to Internet 102 by other methods without departing from the spirit and scope of the present invention such as by cable and modem, integrated services digital network (ISDN), digital subscriber line (DSL), or via a wireless Internet connection. In this example, LS 106 is connected to backbone 105 via an Internet access line 119. User 111 has Internet connectivity through a telephone line 109, a local telephony switch (LS) 108. LS 108 has connection to backbone 105 via an Internet access line 118. Like user 110, user 111 may connect using any available Internet-capable appliance or service.

In this exemplary embodiment, contact center 103 may advertise their products and services through ASB 104 as a third party service. An authorized agent of center 103 may create ads for placement using ACS 125 installed on station 123 within center 103. Alternatively, the authorized agent may navigate to contact server (CS) 120 connected to backbone 105 within Internet 102 and use ACS 124 installed on CS 120 to create ads for placement.

Assuming Internet navigation activity on the part of user 110 and user 111, then users 110 and 111 may be considered potential customers of contact center 103. Users 110 and 111 may trigger ad placement by engaging in normal Internet activity like browsing to and interacting with pages hosted on WS 121 or WS 122 or by using AS 122 as a proxy server in some embodiments. Ad server 122 may place advertisements in pages hosted within and served by WS 121 or WS 122 or AS 122 as all are accessible Internet servers.

When an authorized agent or knowledge worker of center 103 creates an electronic advertisement for service, ACS 125 or in a server-hosted embodiment, ACS 124 enables the agent to set certain conditions for ad service and to provide a pool of contact applets or objects to select from in the event of service placement of the ad.

In one embodiment, real-time or near real-time availability information about certain contact center agents (such as agents 113 and 114) may be updated periodically to data store 123 within ASB domain 104 from any agent availability reporting software running within contact center 103, perhaps available from IPR 112. This possibility is illustrated by the presence of availability reporting routine (ARR) 127 installed, in this case on router 112. APS 126 within AS 122 may consult ARR 127 at the time of ad placement to determine agent availability state for the ad and to determine which contact objects and information to insert into the ad before serving it. ARR 127 may also be used to report overall response capability of agents and systems within center 103 and in some cases the predicted response time that any available agents or systems can currently satisfy any requests that may come in from service of one or more advertisements being placed.

In another embodiment, ARR 127 within router 112 may periodically send data to data store 123 either directly or via CS 120 as a proxy. The data would include the currently available contact objects and optionally the current activity state of the agents and systems servicing customers contacting the center through those various contact objects.

An example of a state report may be that currently telephone call response time at contact object (telephone number) is 15 minutes with no agents currently available. The same report may indicate that the response time for contact object Voice over Internet Protocol (VoIP) is currently immediate with at least one agent currently available to handle calls. APS 126 may embed the VoIP object as opposed to the regular telephone object for immediate contact with a live agent. Another contact object for a telephone number to leave a message or request a call back may also be included as no current state may be tied to that contact object. However, response time may be predicted for voice, text messaging, email, and other forms of synchronous or asynchronous communications mediums and may be used as priority indicators by APS 126 in determining which of several contact options to include in a served advertisement.

In one embodiment, center 103 may be at peak communication load during a peak business period for example. In that event center 103 may not want additional potential customers contacting the center until the communication load threshold for one or more communication mediums used in the center drops below an acceptable threshold. Such real time information may be accessed from IPR 112 and or through pother reporting systems by APS 126 to determine if an advertisement for the center will be served at all over another possible advertisement. An enterprise rule with a value or values may be created and associated to any created advertisements that indicates a suspension of ad serve during certain peak periods of communication load states. The values may be thresholds that may be compared against actual load values such that the ad campaign automatically kicks in only when the center can provide timely service. The campaign would be temporarily suspended when the center cannot adequately service potential responses from electronic service of those ads.

Keeping in mind that the goals of a center like center 103 may be to receive as many contacts as can be reasonable handled but not to lose potential customers to inadequate service or response. Therefore, the advertisements may be intelligently placed based on the current states of the center so that when the center is in need of business, the ads are working for them and when the center is busy handling requests, the ads are suspended until the center is again in need of business. Of course, individual contact objects within ads may be handled in the same fashion. If the telephone is busy, then the IM channel or SMS channel may be the contact object embedded with the ad. All activities of APS 126 are completely transparent to potential customers receiving electronic ads.

AS 122 may serve ads into any Hypertext Markup Language (HTML) electronic Web page or any variations thereof including Wireless Application Protocol (WAP) pages and other forms of text and graphic pages. In one embodiment, electronic ads may be served into live Instant Message sessions or other Chat sessions. A first determination to serve such an electronic ad might be based on subject of the IM conversation or certain keywords used in the conversation. In preferred aspects the final determination to serve an electronic ad is based on one or more threshold values and comparison of statistics to those values prior to determining whether to serve an ad. The ad may be placed or not depending on one or more conditions satisfied or not satisfied by the comparison. So an advertisement that is selected for service into a placeholder on a Web page based on content or keyword or phraseology may be subsequently passed over for service if current statistics indicate that the advertisement should not be served because conditions for service are not met by real time or near real time data.

It will be apparent to one with skill in the art that ad service software like APS 126 may execute and operate on a same server hosting electronic information pages that will carry the target advertisements, or it may execute and operate on a remote server having communication with the server that will insert advertisements into pages before, during, and after those pages are being accessed.

Figure 2:
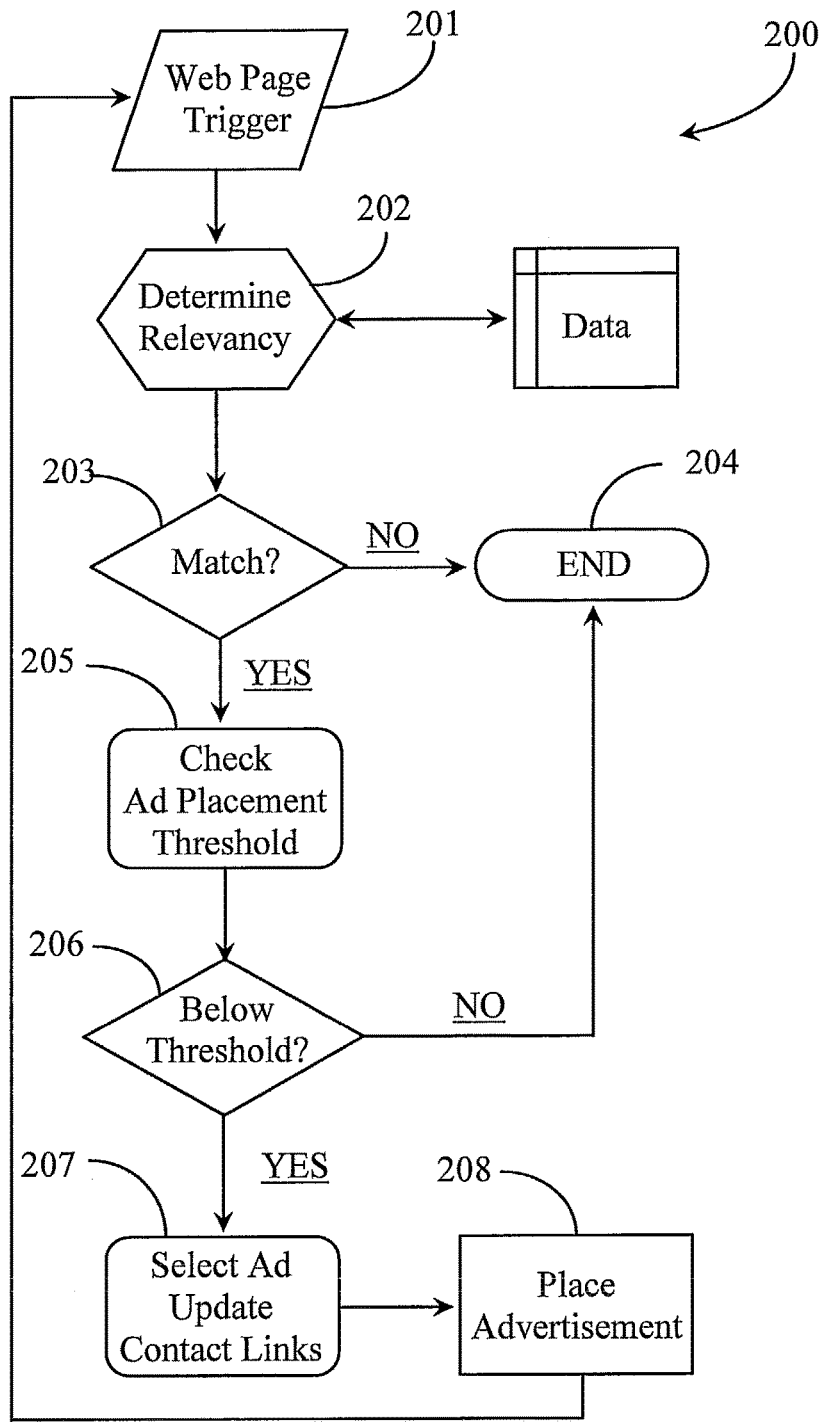
FIG. 2 is a process flow chart illustrating acts for determining when to place an advertisement according to one embodiment of the present invention.

FIG. 2 is a process flow chart 200 illustrating acts for determining when to place an advertisement according to one embodiment of the present invention. At act 201, there is a Web page trigger. The trigger at act 201 may be a browser action calling for service of an electronic information page known to a server. The trigger may include indication of keywords or phrases used in a search wherein the advertisements selected for service might appear on a search results page.

At act 202, the ad server determines relevancy of the conditions of the trigger to one or more advertisements in a pool of advertisements for service. At act 202 there are many possible variations that might apply depending on the circumstance. At act 203, the ad server determines if there is at least one match as a result of the efforts of act 202. If there is no match then there may not be any advertisements served, or there might be only static advertisements served to fill the placeholder or placeholders on the electronic page or form.

If the ad server concludes that there are at least one advertisement selected for service, then at act 205, the ad placement software of the present invention analogous to APS 126 checks if the one or more than one advertisement selected can be served according to current state of activity of the ad owner is above or below a preset threshold value known to the server and associated with the one or more ads targeted for service. Act 205 may be performed individually for each advertisement to be included in service, or it might be performed a single time for a set of two or more advertisements. Moreover, if just one advertisement is considered then there may only be one lookup performed.

In a preferred embodiment, the lookup for data may be performed locally at the ad server in a connected database. The most recent threshold value or values set by an enterprise owning the advertisement or advertisement set, and the most recent activity statistics related to the busy or available states of the enterprise contacts may be accessed. It is important to note herein that there are many different levels of granularity that might be observed when performing the lookup in act 205. For example, an enterprise might set a threshold value for each of the communication mediums it uses to respond to potential customers. In one embodiment, the enterprise may simply set an overall call load threshold average covering all of its communication mediums used to respond to potential customers. The exact nature of the threshold may vary depending on the communications medium or mediums to which the threshold applies. Real time or near real time statistics would apply specifically to the threshold value for comparison including a condition that governs the decision. Moreover, the statistics might address communication load or communication wait time for any given medium. There are many possibilities.

If at act 206, the APS determines that the current statistics are not below the preset threshold, than in act 204, the process may end for that particular comparison. That does not necessarily mean that an advertisement will not be served if there is another threshold value whose statistics come in below the value. For example, the determination may granulate down to which contact information to include with the ad.

If at act 206 checked statistics are below the preset threshold for those statistics, then at act 207 the ad is selected for service and the contact objects are updated accordingly. Therefore if an enterprise, at the time of ad service has a live agent available for a specific communication medium or mediums then the appropriate contact information is embedded into the ad when it is served. If there are no available agents at the time of service, then the advertisement might be passed over for service or it may simply be served with static contact information like email or website address information but may contain no live contact links. Furthermore, the decision may be not to serve the ad at all if there are no live agents available to service potential customers who may interact with the served advertisement. After act 207 is performed, then at act 208 the advertisement is served or placed. The process may resolve back to act 201 after an advertisement has been placed. It is important to note herein that in the event that the criteria or conditions for ad placement are not met for an advertisement in act 206 it does not mean that no ad will be placed into an ad spot. It only meant that the ad that was subject to the comparison would not be served.

Process 200 may be performed for each advertisement in a pool of advertisements reserved for a particular advertisement spot on a Web page or other electronic form. The advertisement pool may list competing advertisements from several different enterprises. The advertisements themselves may be selected for relevancy and other criteria as is currently known. If a winning ad is not served because the enterprise does not have available response personnel at the time of placement, then the next relevant competing advertisement belonging to another enterprise might be selected. An advertisement pool may alternately include advertisements from just one enterprise that has paid for an advertisement spot whenever a certain electronic page is accessed. In this case, the selection process may determine which of the ads in the pool are most relevant and if that ad may be served according to availability of response personnel. There are many possibilities.

Figure 3:
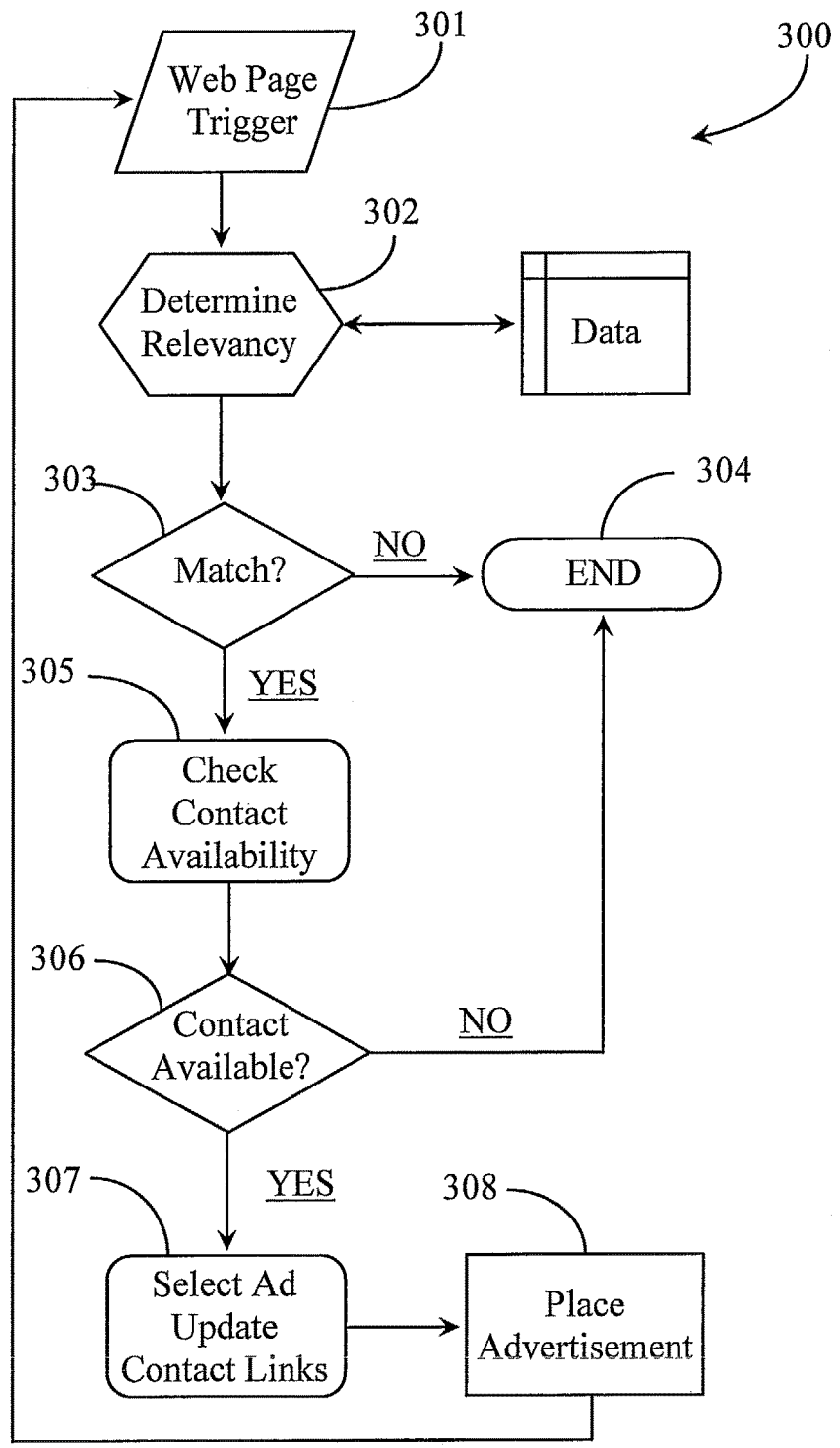
FIG. 3 is a process flow chart illustrating acts for determining when to place an advertisement according to another embodiment of the present invention.

FIG. 3 is a process flow chart 300 illustrating acts for determining when to place an advertisement according to another embodiment of the present invention. Acts 301, 302, and 303 of process 300 may be identical in description to acts 201, 202, and 203 described above with reference to FIG. 2. However, at act 305, the ad placement software (APS) only checks the availability of one or more enterprise contacts at the time of placement of the advertisement. For example, if the advertisement has an Instant Message link placeholder and a voice link placeholder, then only the contact links to those addresses of an available contact or contacts may be included in the ad when it is placed. In this embodiment, the process depends strictly on contact availability, (busy or no) and does not consider any preset thresholds.

If at act 306 it is determined that there are no contacts available for any of the contact links associated with the advertisement then at act 304 the process ends and the advertisement is not served. If there is one or more available contacts determined at act 306, then at act 307 the APS selects the ad for placement and provides the appropriate contact link or links to the contacts that were determined to be currently available at act 306.

The availability of the contacts may be determined locally if presence or availability information is periodically updated to a database local to the ad server. In one embodiment, an ad server like server 122 of FIG. 1 may check with an enterprise router used at the enterprise like IPR 112, for example. The router may have a software instance that provided most current busy or no states for each agent in the center. The contact addresses or numbers of those currently available agents are compared to the ones associated with the particular advertisement and only those links associated with the ad where the agent is available are embedded into the ad when it is served.

At act 308 the ad server places the advertisement. In this act, the enterprise may also include an offer in the advertisement for using the real time contact information. The offer might be for some discount for calling immediately or for being one of the first 10 callers. There are many possibilities. Likewise, the contact links themselves may be personalized. In this embodiment, a telephone number for an available agent may be included with the number and the name of the agent. For example, if there are several different voice extensions each belonging to a different agent, only those whose agents are currently available are embedded into the advertisement along with the names of those available agents. The process resolves back to act 301 after an ad is placed.

In one embodiment, the individual contact links may be rotated in and out of the served advertisement as they take calls and become available while a potential customer is viewing and interacting with the advertisement. This embodiment may require a link to the ad server functioning as a proxy to be established from each instance of a served advertisement while it is displayed. A potential customer then could see on the ad exactly when a contact becomes available.

Instant message service like AIM™ or simple message service SMS might be included as live links along with telephone, VoIP, Chat, and other forms of real time or near real time communications mediums. The actual links used to initiate contact may be associated with the actual contact's name. In some cases, ads may be served based only on availability of one or more live agents. Ads may be served based only on an acceptable response time for one or more media types. Ads may also be served only at certain times of each day depending on enterprise overall or average communication load. There are many possibilities. The methods and apparatus of the invention enable a real time control over which advertisements an enterprise has targeted for service actually get served. In this way the enterprise may plan for optimal levels of business activity while at the same time insuring that enterprise response is timely and of acceptable quality.

The methods and apparatus of the present invention may be used in third party advertisement placement embodiments or in first party advertisement placement embodiments without departing from the spirit and scope of the present invention. For example, on a company Web site, certain quick ads may appear when a contact is immediately available to service customers clicking on those ads when they do appear. To illustrate an example, a car site might have an ad for a new Honda that just arrived on the lot with a link to a salesman that is waiting by the telephone. The deal might be the first customer to call in reserves a large rebate if they purchase the car that day. There are many possible uses of versions of the software of the present invention.

The methods and apparatus of the present invention may be practiced using some of or all of the components and features described herein without departing from the spirit and scope of the present invention. The invention may be practiced over the Internet network, a corporate wide-area-network (WAN) or over a combination of those networks and any local area networks (LAN). The methods and apparatus of the invention should be afforded to broadest possible scope in light of the multiple applications, some of which already have been described. The spirit and scope of the present invention shall only be limited by the following claims.

What is claimed is:

1. A system, comprising:
a hardware server operable to execute instructions stored in memory to:
determine to serve an electronic advertisement;
determine a real-time availability status of contact agents associated with the advertisement prior to serving the advertisement;
embed one or more contact objects in the advertisement based on the determined availability status of the contact agents prior to serving the advertisement; and
serve the advertisement via a packet data network for presentation on a user device.

2. The system of claim 1, wherein a contact object comprises indicia directing recipients of an advertisement how to connect to an advertiser contact agent.

3. The system of claim 2, wherein the indicia comprise one or more active links in an advertisement, for accomplishing contact for a viewer with the advertiser contact agent.

4. The system of claim 3, wherein the one or more active links comprise one of a telephone, an instant messaging, a chat session, or a text messaging communication link between an advertisement recipient and an advertiser contact agent.

5. The system of claim 1, in combination with one or more network hardware servers configured to provide hosted within a network search service.

6. The system of claim 5, wherein the server is further configured to select advertisements from the memory based at least in part upon keywords entered by a searcher.

7. The system of claim 1, wherein the system is further configured to determine an anticipated wait time associated with at least one contact means and to include, in an embedded contact object, an indication of the wait time associated with at least one contact means in an advertisement to be served.

8. A method comprising:
- determining, by a server operable to execute instructions stored in a memory, to serve an electronic advertisement;
- determining, by the server, information related to a real-time availability status of contact agents associated with the advertisement prior to serving the advertisement;
- embedding in the advertisement, by the server, one or more contact objects based on the determined availability status of the contact agents prior to serving the advertisement; and
- serving the advertisement via a packet data network for presentation on a user device.

9. The method of claim 8, wherein a contact object comprises indicia directing recipients of an advertisement how to connect to an advertiser contact agent.

10. The method of claim 9, wherein the indicia comprise one or more active links in an advertisement, for accomplishing contact for a viewer with the advertiser contact agent.

11. The method of claim 10, wherein the one or more active links comprise one of a telephonic, an instant messaging, a chat session, or a text messaging communication link between an advertisement recipient and an advertiser contact agent.

12. The method of claim 8, further comprising hosting the server in combination with one or more network hardware servers to provide a network search service.

13. The method of claim 12, wherein selecting and serving advertisements is based at least in part upon keywords entered by a searcher.

14. The method of claim 8, further comprising determining an anticipated wait time associated with at least one contact means and including, in an embedded contact object, an indication of the wait time associated with at least one contact means in an advertisement to be served.

* * * * *